Jan. 3, 1961    CARL-ERIK GRANQVIST    2,966,824
DISTANCE MEASURING EQUIPMENT
Original Filed April 28, 1952

INVENTOR
CARL ERIK GRANQVIST,
BY Lawson and Taylor
ATTORNEYS

United States Patent Office 2,966,824
Patented Jan. 3, 1961

2,966,824

DISTANCE MEASURING EQUIPMENT

Carl-Erik Granqvist, Lidingo, Sweden, assignor to Svenska Aktiebolaget Gasaccumulator, Lidingo (near Stockholm), Sweden, a corporation of Sweden Continuation of application Ser. No. 284,835, Apr. 28, 1952. This application Apr. 12, 1956, Ser. No. 577,847

9 Claims. (Cl. 88—1)

This invention relates to distance measuring equipment and more specifically to an apparatus and method for accurately determining the distance between two fixed objects. The present application is a continuation of my prior application Serial No. 284,835, filed April 28, 1952, for "Distance Measuring Arrangement," now abandoned.

In general, the present invention relates to distance measuring apparatus in which a light beam is modulated at a predetermined frequency and is reflected from an object to a receiver. By comparing the phase of the outgoing modulated beam with the phase of the received beam an indication of the distance to the object is given. Such a system is, for example, disclosed in the Wolff Patent 2,234,329 issued March 11, 1941.

The present invention incorporates the basic principles of the prior art system described above and provides a number of improvements which increases the accuracy of the system appreciably. According to the present invention, the light is modulated by means of a Kerr cell. The modulated light beam is transmitted, reflected and received and the received signal is fed to a phase meter which is in the form of a null meter, the received signal being fed to one side of the meter and the transmitted signal on the other side of the meter. A variable delay unit is inserted in the circuit between the modulator signal source and the phase meter so that the phase of the transmitted signal as fed to the phase meter can be delayed until the received signal is exactly balanced and the phase meter reads zero. An adjustable known light path is then substituted for the unknown distance and the phase meter is again made to read zero by adjusting the length of the light path. The distance is then read from a scale on the adjustable light path. The advantage in the utilization of a known adjustable light path to make the final distance determination is to compensate for inaccuracy in the variable delay unit and the associated electrical network. Variations in the characteristics of the electrical network are brought about by changes in atmospheric conditions and by using the adjustable light path the electrical delay unit is, in effect, calibrated for each reading.

The primary advantages in the presently described method and apparatus reside in the use of a null meter and a variable delay unit to determine the phase of the received signal and in the use of an adjustable light path to calibrate the electrical circuit. It is possible to obtain greater accuracy in adjusting a meter where two signals are fed into the meter in opposition to one another and adjustments are made so that the signals exactly counterbalance each other and the meter reads zero. There is no possibility of variations in readings occurring due to external conditions such as temperature or humidity due to the fact that the electrical network is calibrated by the adjustable light path. Thus, the presently described apparatus attains great accuracy corresponding to a maximum error of a few centimeters per 10 kilometers. This accuracy is far greater than has been possible with equipment used heretofore.

An object of the present invention is to provide a method and an apparatus for measuring distances in which great accuracy is attainable.

Another object of the present invention is to provide distance measuring equipment in which a null meter and variable delay unit are utilized to determine the phase of the received modulated light beam.

Still another object of the present invention is to provide distance measuring equipment in which an adjustable known light path is utilized to calibrate the electrical circuit of the instrument.

Other objects and many of the attendant advantages of the present invention will be readily appreciated when considered in connection with the accompanying drawings wherein.

Figure 1:
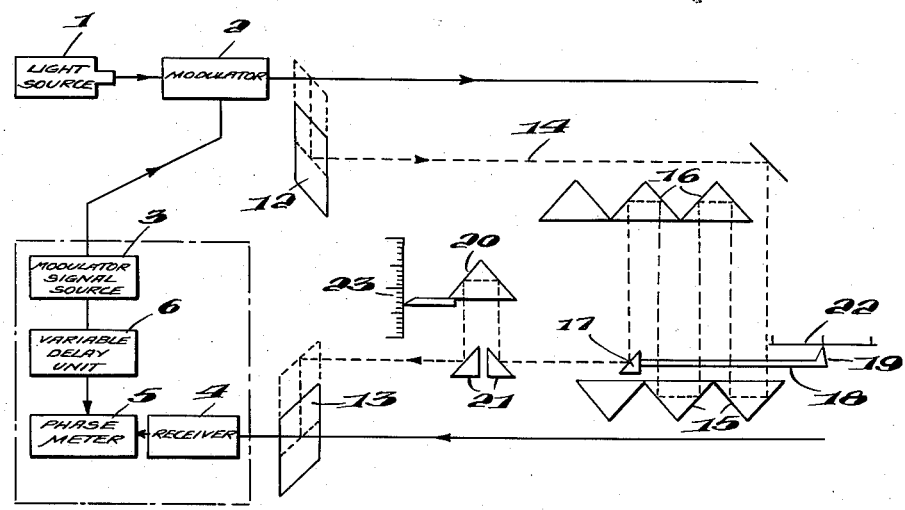
Fig. 1 is a block diagram of the system.

Referring now more particularly to the drawing, wherein like numerals indicate like parts throughout the several views, there is shown at 1 a light source which may be of any suitable variety such as, for example, a 20 watt tungsten projection lamp. The light from this light source is modulated by modulator 2 which is a Kerr cell. A Kerr cell is well known in the art and consists of a glass container made to optical specifications in which there are two electrodes immersed in a birefringent. The Kerr cell is utilized in combination with a pair of polarized lenses and when voltage pulses are applied to the electrodes of the Kerr cell pulses of light are transmitted. These voltage pulses are applied by a modulator signal source 3 which is a crystal controlled oscillator. The Kerr cell may be modulated at any suitable frequency such as, for example, 10 megacycles per second.

The modulated light beam is transmitted and is reflected by a distant reflex system such as a plain mirror located at the point to which the distance is to be measured. The reflected beam is received by receiver 4 which consists of a photomultiplier tube in which the light signal is amplified and applied to phase meter 5 comprising a null detector amplifier circuit.

Figure 2:
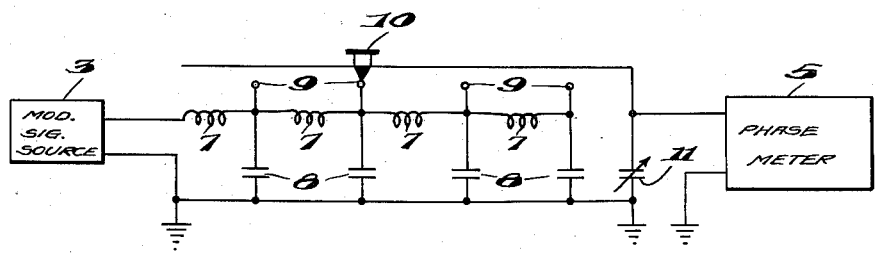
Fig. 2 is a circuit diagram of the variable delay unit.

The signal transmitted by the modulator signal source 3 is fed to a variable delay unit 6, the output of which is fed to phase meter 5. The variable delay unit 6 is shown more clearly in Fig. 2. A series of inductances 7 and shunt capacitances 8 are provided with tapping points 9. An adjustable tap 10 is adapted to be shifted between tapping points 9 to produce any desired time lag in the signal fed to phase meter 5. An adjustable condenser 11 is provided to make fine adjustments in the phase of the signal transmitted.

By suitable adjustment of the variable delay unit 6 the signal fed by this unit to the phase meter 5 can be made to exactly counterbalance the phase of the signal from receiver 4 so that the meter reads zero. Variations in the characteristics of the delay line and in the associated electrical network are possible so that it is not desirable from the point of view of accuracy to have the variable delay unit calibrated directly in terms of distance. Instead, the delay unit is calibrated for each reading by an adjustable light path of known distance.

A pair of prisms 12 and 13 are provided and these prisms are shifted by any suitable mechanical means from the position shown in full lines to the dotted line position. Thus, the modulated light beam, instead of being transmitted to the distant reflector, is passed through the prism 12 and along the path indicated at 14. A number of prisms 15 and 16 are provided so that the light beam traverses a number of parallel paths. The number of parallel paths traversed is determined by the position of reflector 17 mounted on arm 18 having a pointer 19 on the opposite end thereof. An adjustable prism 20 and reflectors 21 provide a further fine adjustment of the length of the light path. By reading scales 22 and 23 the distance may be determined.

By first adjusting the variable delay unit 6 so that the phase meter 5 reads zero when the signal is transmitted to the distant reflector and subsequently substituting the adjustable known light path and setting the reflector 17 and prism 20 so that the phase meter 5 again reads zero, the distance as read by scales 22 and 23 is the same as the distance to the distant reflector. The scales 22 and 23 give the distance only in terms of the fraction of a half wave length that is involved. The number of full wave lengths must be known. If only one frequency is used, for example, 10 megacycles, then the distance from the apparatus to the reflex system must be known to plus or minus seven and one-half meters. Such a knowledge of the distance would restrict the use of the instrument to precise determination of roughly measured lines. However, a second frequency may be provided which is one percent higher than the first, or for example, 10.1 megacycles. The second frequency has a wave length one percent less than the first. By making measurements on two independent frequencies a vernier effect is obtained in space and with the two frequencies the distance need be known only to plus or minus 750 meters or approximately plus or minus one-half mile.

Figure 3:
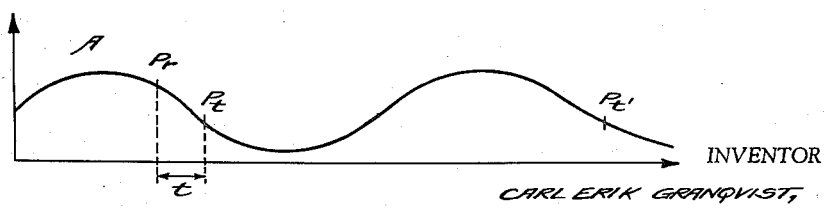
Fig. 3 is a graph showing the relationship of the transmitted and received signal.

With reference to Fig. 3 the modulation signal is shown by the curved A. The phase meter 5 measures or responds to the difference in modulation phase between the received wave and the transmitted wave. If, at a particular instant, the received wave has a phase corresponding to the point $P_r$ of the curve, the phase of the transmitted wave will correspond to a point $P_t$ which occurs later on the curve. Thus, it is clear that the difference in phase corresponds to the time required for the modulated signal to travel from transmitter to receiver which is equal to the time $t$ if the abscissas represent time.

By the utilization of the variable delay unit 6 the point $P_t$ is, in effect, shifted so that it corresponds to the point $P_r$. The light path of known length is then used to determine what distance this difference in time represents. In this manner, variations in the electrical characteristics of the elements of the apparatus will not affect the reading.

Obviously, many modifications and variations of the present invention are possible in the light of the above teachings. What is claimed as new and desired to be secured by Letters Patent is:

1. An optical distance measuring device comprising a light source, means for modulating said light source at a predetermined frequency, transmitter means for transmitting a beam of light from said modulated light source, receiver means for receiving the beam reflected from a light reflecting system, means for generating a reference voltage of said predetermined frequency in phase with the modulation of the light source, phase comparison means for comparing the phase of the reference voltage and that of the reflected beam, adjustable electrical delay means for delaying the phase of the reference voltage to correspond to the phase of the reflected beam, optical delay means including a light path of adjustable length, and switching means for switching said light path to an operative position to transmit the light to the receiver via said optical delay means, whereby the difference between the phase delay over the distance and that over the adjustable light path may be obtained through adjustment of said optical delay means.

2. A distance measuring arrangement comprising a transmitter for transmitting a modulated light wave, a receiver for receiving said modulated light wave after propagation thereof along a predetermined propagation path, an optical delay device having an adjustable delay calibrated for distance measurement, means for substituting said optical delay device for said predetermined propagation path, thereby to make possible a comparison of the delay of said wave along said predetermined path with the delay effected by said optical delay device, means for generating a reference voltage in phase with the modulation of said transmitted wave, and phase-responsive means for comparing the modulation phase of said reflected wave with that of said reference voltage, said phase-responsive means including a variable delay device arranged to delay said reference voltage, thereby enabling measurement at a desired phase difference between the reflected wave and the reference voltage.

3. An arrangement as claimed in claim 2, wherein said optical delay device comprises an auxiliary propagation path of adjustable length.

4. An arrangement as claimed in claim 3, in which said auxiliary propagation path comprises a number of cascaded parallel paths and a stepwise-adjustable intercepting means adapted to intercept said modulated wave after passage thereof through a selected number of said paths.

5. An arrangement as claimed in claim 4, comprising a path of continuously adjustable length in cascade with said parallel paths.

6. An arrangement as claimed in claim 4, in which said parallel paths are interconnected by means of reflecting prisms arranged at the ends thereof.

7. An arrangement as claimed in claim 4, in which said intercepting means comprises a reflector adjustable in a direction normal to said paths.

8. An arrangement as claimed in claim 2, in which said phase-responsive means comprises a phase comparation device responsive to the difference in modulation phase between said transmitted and said reflected wave.

9. An arrangement as claimed in claim 2, in which said transmitter comprises a wave signal source and a modulator for modulating the signal thereof in accordance with a modulation signal, a modulation signal source being adapted to apply a modulation signal to said modulator and to said phase-responsive means.

References Cited in the file of this patent

UNITED STATES PATENTS

| | | |
|---|---|---|
| 1,924,174 | Wolf | Aug. 29, 1933 |
| 2,234,329 | Wolff | Mar. 11, 1941 |
| 2,236,893 | Chaffee | Apr. 1, 1941 |
| 2,237,193 | Mobsby | Apr. 1, 1941 |
| 2,429,623 | Hoisington | Oct. 28, 1947 |
| 2,583,596 | Root | Jan. 29, 1952 |

OTHER REFERENCES

"Final Measurement of the Velocity of Light," Anderson, Journal of the Optical Society of America, vol. 31, No. 3, March 1941.

"A Preliminary Determination of the Velocity of Light," Bergstrand, Arkiv for Matematik, Astrononmi och Fysik, Band 36, No. 020, Feb. 1, 1949.

"Velocity of Light and Measurement of Distances," Bergstrand, Proceedings of the London Conference on Optical Instruments, 1950, pages 187–200.

"Fundamentals of Optics," Jenkins and White, 2d edition, 1950, McGraw-Hill Book Co., Inc., New York, pages 386–389.